United States Patent [19]

Muhs et al.

[11] Patent Number: 5,701,370

[45] Date of Patent: Dec. 23, 1997

[54] OPTICAL FIBER SENSORS FOR MONITORING JOINT ARTICULATION AND CHEST EXPANSION OF A HUMAN BODY

[75] Inventors: Jeffrey D. Muhs, Lenoir City; Stephen W. Allison, Knoxville, both of Tenn.

[73] Assignee: Lockheed Martin Energy Systems, Inc., Oak Ridge, Tenn.

[21] Appl. No.: 767,697

[22] Filed: Dec. 17, 1996

Related U.S. Application Data

[63] Continuation of Ser. No. 514,454, Aug. 11, 1995, abandoned.

[51] Int. Cl.[6] ........................................... G02B 6/00
[52] U.S. Cl. ........................... 385/13; 385/12; 128/781
[58] Field of Search ..................... 385/13, 12; 128/633, 128/634, 635, 774, 779, 781, 782; 250/227.14, 227.15, 227.16; 602/16, 5, 28, 20, 21, 22, 23, 26, 27

[56] References Cited

U.S. PATENT DOCUMENTS

| | | | |
|---|---|---|---|
| 4,560,016 | 12/1985 | Ibanez et al. | 177/210 R |
| 4,734,577 | 3/1988 | Szuchy | 250/227 |
| 4,830,461 | 5/1989 | Ishiharada et al. | 350/96.29 |
| 4,937,029 | 6/1990 | Ishiharada et al. | 264/1.4 |
| 5,398,697 | 3/1995 | Spielman | 128/782 X |

OTHER PUBLICATIONS

"Silicon Rubber Fiber Optic Sensors", Jeffrey D. Muhs, Reprinted from Phototonics Spectra, Jul., 1982 pp. 1–4.

*Primary Examiner*—Phan T. H. Palmer
*Attorney, Agent, or Firm*—Preston H. Smirman

[57] ABSTRACT

Fiber-optic sensors employing optical fibers of elastomeric material are incorporated in devices adapted to be worn by human beings in joint and chest regions for the purpose of monitoring and measuring the extent of joint articulation and chest expansion especially with respect to time.

18 Claims, 2 Drawing Sheets

OPTICAL FIBER SENSORS FOR MONITORING JOINT ARTICULATION AND CHEST EXPANSION OF A HUMAN BODY

This application is a continuation of application Ser. No. 08/514,454, filed Aug. 11, 1995, now abandoned.

BACKGROUND OF THE INVENTION

This invention relates generally to body supporting apparatus provided with optical-fiber sensor means for the monitoring and measuring of movement of selected components of the human body. More particularly, the present invention relates to such apparatus for the monitoring of the magnitude and number or repetitions of movement of selected body components such as joint articulation and chest expansion during therapeutic and exercise regimens. This invention was made with the support of the United States Government under contract No. DE-AC05-84OR21400 awarded by the U.S. Department of Energy. The United States Government has certain rights in this invention.

The accurate detection and measurement of loads applied to a structure has been achieved by employing optical-fiber sensors. These optical-fiber sensors utilize the amount of light attenuation in the one or more optical fibers of the sensor for determining the amount of load applied to the optical-fiber sensor-supported structure. Some optical-fiber sensors employ glass or plastic optical fibers that are attached to or supported within a structure to be monitored. These optical fibers are oriented with respect to the supporting structure so as to have one or more curved sections thereon so that upon any additional bending or straightening of the curved sections, the original radius of the curved sections will be changed to correspondingly decrease or increase the amount of light being transmitted through the optical fibers with the resulting amount of light being transmitted through the optical fibers providing a signal indicative of the load applied to the structure in the region of the optical-fiber sensor. Such glass and plastic optical-fiber sensors for load measurement purposes are described in the literature such as in U.S. Pat. No. 4,734,577.

Recent developments in optical-fiber sensor technology include the utilization of optical fiber sensors wherein the core and cladding of the optical fiber is formed of a substantially transparent elastomeric material such as a synthetic rubber selected from chloroprene rubber, urethane rubber, silicone rubber, acrylic rubber, fluorene rubber, ethylene-propylene rubber, ethylene-propylene diene rubber, terpolymer rubber, and epichlorohydrin rubber. Optical fibers formed of elastomeric material and sensors employing such elastomeric optical fibers are described in U.S. Pat. Nos. 4,830,461 and 4,937,029. As described in these patents, pressure-sensitive sensors using optical fibers formed of elastomeric material can be placed on or attached to a surface of a structure to be monitored so that a compression loading or a bending force imposed upon the structure will deform the optical fiber and change the cross-sectional dimensions in at least one substantially linear region so as to change the amount of light passing through the optical fiber with such a change in light transmission corresponding to the extent of change in the cross-section or the radius of the optical fiber. Inasmuch as optical-fiber sensors incorporated in body-supported apparatus or devices of the present invention utilize optical fibers formed of elastomeric material as described in U.S. Pat. Nos. 4,830, 461, and 4,937,029, these patents are incorporated herein by reference.

While optical-fiber sensors have been previously developed for utilization in many applications, including those listed in the aforementioned patents, the development and utilization of optical-fiber sensors for detecting and measuring events occurring in the body of an animal such as a laboratory or research animal or in a human being or for monitoring events occurring within the human body caused by body movement has only recently been considered. For example, in the commonly assigned and allowed U.S. Patent application entitled "Sensors and Method For Detecting Events Occurring in Elastic Material", J. D. Muhs et al, Ser. No. 08/086,444, filed Jun. 30, 1993, now U.S. Pat. No. 5,374,821 optical-fiber sensors utilizing elastomeric optical fibers such as described above are embedded within internal components of an animal such as a human being. These so-embedded optical fibers are utilized for monitoring, detecting, and measuring events occurring within internal body components such as and including muscle and organ flexure or relaxation along with any attrition or atrophy or the growth of such muscles and organs. This in-vivo utilization of the optical-fiber sensors is particularly useful for physical therapy and various medical diagnostic research programs involving the workings of internal components within the body of the animal or human being. This commonly assigned patent application is incorporated herein by reference.

The aforementioned and other developments in optical-fiber sensor technology are representative of increasing interest in the use of optical-fiber sensors in place of many previously used sensors due to the high reliability and accuracy of the optical-fiber sensors in providing data descriptive of events occurring in or on the structure supporting the optical-fiber sensors. However, one area in which optical-fiber sensors have yet to be adequately addressed is in conjunction with the monitoring and measuring activity in human body components defined by joint articulation or chest expansion such as required for monitoring various medical procedures including therapeutic and orthopedic rehabilitation of the knee, elbow, hip, neck, back, wrist, finger joints, jaw, and other joint areas as well as the monitoring and measuring chest expansion and breathing rates in medical and exercise regiments. To date no satisfactory devices, especially those employing optical-fiber sensors that are immune to electromagnetic interference, are presently available for providing such monitoring of joint articulation or chest expansion, particularly with respect to time, which can satisfactorily supply or satisfy these needs.

SUMMARY OF THE INVENTION

Accordingly, it is a principal aim or objective of the present invention to provide a device or apparatus with optical-fiber sensor means which can be placed or worn on the human body at various locations for monitoring and measuring movement of a particular human body component such as joint articulation or the expansion or contraction of the chest or muscle region. Generally, the present invention is a fiber-optic device comprising: base means having first and second end portions and a moveable central portion adapted to at least substantially span a selected movable component of a human body; means for securing the first and second end portions of the base means to selected portions of the human body to maintain the base means in a fixed position with respect to the selected portions of a human body with the central portion of the base means at least substantially spanning the selected component of the human body for conjunctive movement therewith; optical fiber means formed of an elastomeric material and having first and second end regions and a central region therebetween; means for attaching the first and second end regions of the optical fiber means to the first and second end portions of the base means with the central region of the optical fiber means being positioned contiguous to the central portion of the base means and at least substantially spanning the selected body component; attaching means for securing the central region of the optical fiber means to the movable central portion of the base means for effecting conjunctive movement therewith upon movement of the selected body portion to deform the central region of the optical fiber means with the extent of the deformation of the central region of the optical fiber means being dependent upon the extent of conjunctive movement of the central region of the optical fiber means with the central portion of the base means; light transmitting means coupled to one of the end regions of the optical fiber means for transmitting light through the optical fiber means; and, light receiving means coupled to one of the end regions of the optical fiber means for receiving light transmitted through the optical fiber means with the amount of light being received by the light receiving means being proportional to the extent of deformation of the central region of the optical fiber means and providing a signal indicative of the extent of each movement of the selected body portion from a selected position.

Another object of the present invention is to a provide fiber-optic device for monitoring the extent of movement of a component of a human body wherein the selected component of the human body is an articulation providing relative movement between adjacent skeletal portions of the human body. More specifically, where the articulation is a knee with the first end and second end portions of the base means being respectively adapted to at least substantially encompass leg regions of the human body located above and below the knee. The movable central portion of the base means comprises hinge means having first and second sections relatively movable with respect to one another about a arcuate plane upon genuflection of the knee. Also, the central region of the optical fiber means is supported by the first and second end sections of the hinge means by the means for attaching the central region optical fiber means to the central portion of the base means whereby the relative movement between the first and second sections of the hinge means effects the deformation of the central region of the optical fiber means.

Another object of the present invention is to provide a fiber-optic device for monitoring the extent of movement of a component of a human body wherein the selected portion of the human body is in the chest region and subject to expansion and contraction and with the base means comprising elongated belt means encompassing the body about the chest region. The moveable central portion of the base means comprises an elongated segment of the belt means formed of elastic material that substantially encompasses the chest region. The central region of the optical fiber means is supported by the elastic segment so that the deformation of the central region of the optical fiber means is provided by the stretching of the elongated segment of elastic material during the expansion of the chest region and thereby effecting the stretching and/or bending of the central region of the optical fiber means.

A further object of the present invention is to provide timing means which are coupled to the light receiving means for receiving the signal therefrom in order to provide a signal indicative of the number of movements and the extent of each movement of the selected body portion with respect to time, magnitude and the duration of time between and during each movement of the selected body portion.

Other and further objects of the present invention will become obvious upon an understanding of the illustrative embodiments about to be described or will be indicated in the appended claims, and various advantages not referred to herein will occur to one skilled in the art upon employment of the invention in practice.

Preferred embodiments of the invention have been chosen for the purpose of illustration and description. The preferred embodiments illustrated are not intended to be exhaustive nor to limit the invention to the precise forms shown. The preferred embodiments are chosen and described in order to best explain the principles of the invention and their application and practical use to thereby enable others skilled in the art to best utilize the invention in various embodiments and modifications as are best adapted to the particular use contemplated.

DETAILED DESCRIPTION OF THE INVENTION

As briefly described above the present invention is directed to a device or apparatus adapted to be worn or supported by a human body component for monitoring and measuring body movement such as joint articulation and chest expansion and retraction as required of various medical and therapeutic procedures including orthopedic rehabilitation and exercise regiments. These devices along with the associated circuitry provide a measurement of joint articulation and chest expansion and contraction, especially with respect to time, for providing records useable for medical purposes such as for orthopedic rehabilitation of joints and the monitoring of breathing rates such as during physical examinations or stress exercises. The optical-fiber sensors of the present invention utilize optical fibers of elastomeric material such as described in the aforementioned U.S. Pat. Nos. 4,830,861, and 4,937,029 and have at least one of the core and cladding formed of silicone rubber, more preferably, with the core being formed of silicone rubber.

Figure 1:
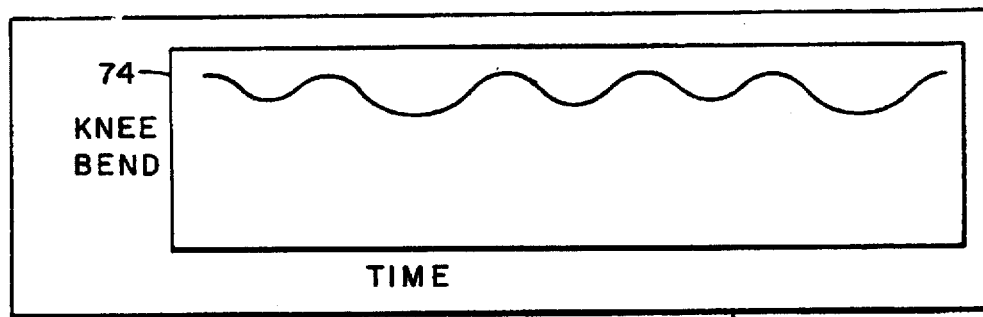
FIG. 1 is a schematic illustration showing one embodiment of the present invention wherein a knee brace or support is provided with an optical-fiber sensor spanning the knee for monitoring and measuring the extent of genuflexion thereof, especially with respect to time.
Figure 1:
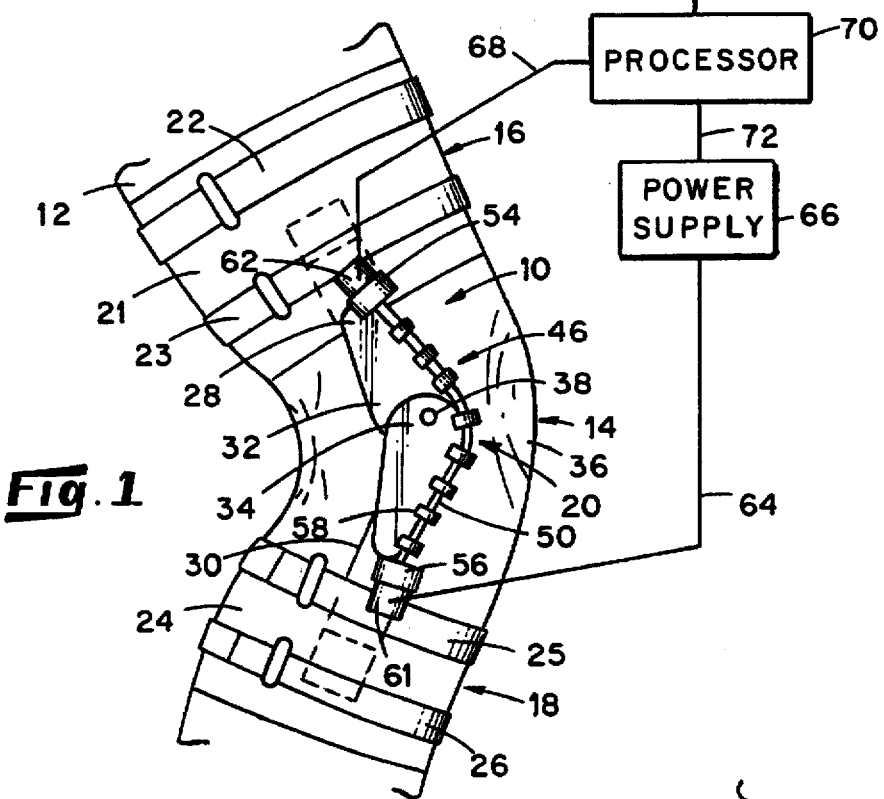
Figure 2:
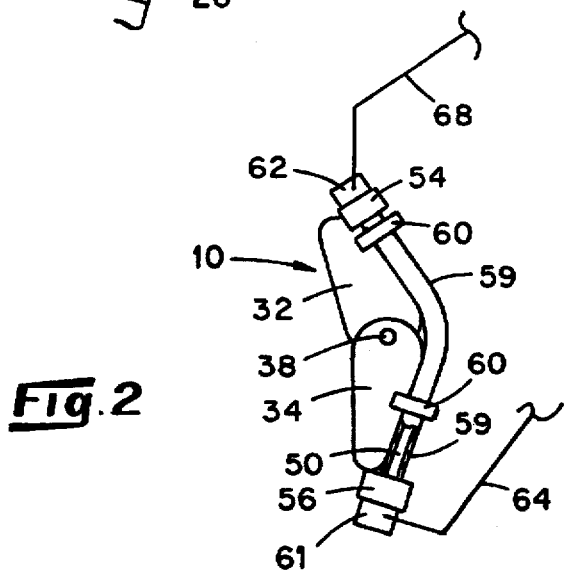
FIG. 2 is a fragmentary view illustrating a modification of the mechanism utilized for maintaining the optical-fiber sensor in a selected position on the knee brace support required for deforming the optical fiber during genuflexion.

With reference to FIGS. 1 and 2, the device for measuring joint articulation in a human body is generally shown at 10 as attached to the leg 12 of a human being at the knee 14. This device is particularly suitable for use in orthopedic rehabilitation for measuring the extent of displacement or movement, i.e. the articulation or genuflexion, of the knee 14 especially with respect to time. The device 10, except for the novel incorporation of the fiber-optic sensor and associated circuitry, can be of a substantially conventional design and construction such as typical of knee braces or supports worn by athletes to prevent injury or aggravating a knee injury or for reinforcing the knee region for users recovering from knee surgery or injury in this device 10 the knee brace or support is shown comprising an upper portion 16 and a lower portion 18 which are respectively attached in a fixed positional relationship to the leg 12 in the thigh and calf region of the user for supporting therebetween an intermediate hinge portion 20 spanning the knee 14 and permitting relatively unencumbered articulation of the knee such as common achieved with known knee braces. While only one hinge portion 20 is shown, it will appear clear that most knee braces have a corresponding structure placed on the opposite side of the knee. Also, in accordance with the present invention, an optical-fiber sensor may be incorporated on one of these hinge portions or, alternatively, on both hinge portions so as to provide a second signal indicative of knee movement.

The upper portion 16 of the device 10 is shown formed of a sleeve 21 of elastic webbing material such as commonly used for knee supports and the like for securely positioning the upper portion 16 of the device 10 over the lower thigh region of the user for positioning and maintaining the hinge portion 20 at the knee 14. Also, as shown the upper portion 16 may be provided with adjustable straps 22 and 23 with the appropriate buckles of fasteners for adjusting the position and the tightness of the upper portion 16 over the selected part of the thigh region and thereby assuring that the hinge portion 20 is properly positioned at the knee 14.

The lower portion 18 of the device 10 may be constructed of sleeve 24 of an elastomeric webbing material substantially similar of the upper region but of a smaller size to appropriately fit the upper calf region of the user. Also, the lower portion 18 with adjustable straps 25 and 26 with appropriate buckles or fasteners may be used for securing the lower portion 18 to the calf region.

The hinge portion 20 of the device 10 is shown comprising first and second elongated projections 28 and 30 formed of a suitable rigid material such as metal or plastic with each of these first and second elongated projections 28 and 30 having an end segment thereof extending into or over a selected part of the upper and lower portions 16 and 18, respectively, and are securely attached to the upper and lower sections 16 and 20 for maintaining the projections 28 and 30 in a fixed orientation with respect to the knee 14. Generally, this orientation of the projection 28 and 30 required of a knee brace is along line essentially parallel to the longitudinal axis of femur and tibia. The exposed end segments 32 and 34 of the first and second elongated projections 28 and 30 meet at the knee region behind the patella 36 in an overlapping or tongue and groove arrangement with the end segments 32 and 34 being coupled together by a simple pin mechanism such as generally shown at 38 for providing a pivot axis for the hinge portion 20 about an arcuate plane. These hinge-forming end segments 32 and 34 are usually of a generally rectangular configuration with spaced apart edge regions separated by a planar central body region so as to fit close to the knee 14 and yet provide sufficient structural integrity for supporting the knee 14 while providing the required hinging action.

Instead of forming the knee brace or device 10 of elastic webbing material, the knee brace as described above may be formed of joinable sections of leather or plastic that are adapted to conform to the shape of the appropriate leg regions as is well known in the construction of knee braces. Such leather or plastic knee braces as well as braces or supports for other joint regions are usually provided with adjustable straps with fasteners of "Velcro" or the like securing mechanisms for assuring the positioning of the brace at the desired location on the body. However, the particular construction of the knee brace or other body joint brace or support is not essential to the present invention as long as a hinge or hinge like construction is provided as substantially described above for the incorporation of a fiber-optic sensor in accordance with the present invention.

The aforementioned objectives of the present invention are achieved by fitting the knee support or device 10 with the fiber-optic sensor as substantially described above and generally shown at 46 and which is attached to and supported by the hinge portion 20 so that any relative displacement of the upper and lower segments 32 and 34 of the hinge portion 20 about the pivotal axis provided at the pin mechanism 38 as would normally occur during articulation of the knee, would cause the optical fiber, shown at 50, to be deformed by the bending and stretching thereof. This deformation of the optical fiber 50 decreases the cross-sectional dimensions thereof in accordance with the extent of deformation for correspondingly attenuating the light transmission through the optical fiber 50 and thereby providing a light signal indicative of the extent of such deformation. In order to support or properly position the optical fiber 50 at the hinge region to provide the aforementioned bending and stretching action, the optical fiber 50 is mounted on the edge regions of the hinge segments 32 and 34 facing the patella 36. With the central region of the optical fiber 50 supported on and substantially co-extensive with the edges of the hinge segments 32 and 34 facing the patella 36, the opposite end regions of the optical fiber 50 extend onto and are fixedly attached to the upper and lower sections 16 and 18 of the device 10 by suitable clamps such as shown at 54 and 56. These optical-fiber clamps 54 and 56 may be provided by stitching a small piece of elastic material over each end region of the optical fiber 50 in such a manner as to secure the end regions of the optical fiber 50 in position at the desired location on the upper and lower portions 16 and 18 so that stretching and bending of the central region of the optical fiber 50 may occur during knee articulation.

In order to support the central region of the optical fiber 50 on the edges of the hinge portion 20 facing the patella 36, a suitable clamping or attaching arrangement is used. Satisfactory clamping of the central region of the optical fiber 50 to these edge regions of the hinge portion 20 can be achieved by using spaced-apart generally U-shaped plastic or metal fixtures 58 which are secured by screws or bonding to the upper and lower segments 32 and 34 of the hinge portion 20. These clamps 58 will hold the optical fiber 50 in place on the edges of the upper and lower hinge segments 32 and 34 of the hinge portion 20 while permitting relative linear movement of the central region of the optical fiber 50 with respect to the ends thereof in the clamping fixtures 58 so as to permit the stretching of the central region of the optical fiber 50 during the articulation of the knee 14. These clamping fixtures 58 also assure that the central region of the optical fiber 50 will bend about the hinge axis during knee articulation to effect deformation of the optical fiber 50 by the bending thereof.

Alternatively, as shown in FIG. 2, the optical fiber 50 can be "clamped" to the edges of the upper and lower hinge segments 32 and 34 of the hinge portion 20 facing the patella 36 by loosely encasing the central region of the optical fiber 50 in a tube 59 of an elastomeric material of any suitable elastic material such as synthetic rubber and attaching this tube 59 to the appropriate edges of the hinge segments 32 and 34. This attachment of the tube 59 to the hinge segments 32 and 34 may by achieved by using any suitable attaching means such as clamps 60 which substantially correspond to the clamps 58 used in the FIG. 1 embodiment.

As shown in FIG. 1, the optical fiber 50 has the lower end thereof coupled to a light source 61 such as a light emitting diode (LED) which is attached to and supported on the lower portion 18 of the device 10 for transmitting light through the optical fiber 50. This transmitted light is received at the opposite end of the optical fiber 50 by a light receiver 62 provided by a photo diode of the like shown supported on attached to the upper section 16 of the device 10. This attachment of the light source 61 and the light receiver 62 can be achieved in any suitable manner such as merely utilizing a small pocket in the elastic material or by attaching them to the elastic material by any suitable arrangement. If the upper and lower portions 16 and 18 are formed of leather or plastic, a small adjustable strap would be adequate to hold the light source 61 and the light receiver 62 in place. Also, while the optical fiber 50 is shown with the light source 61 and the light receiver 62 positioned at opposite ends, it will appear clear that a suitable reflector (not shown) may be positioned at one end of the optical fiber 50 remote to the light source 61 so that the light source 61 and the light receiver 62 can be positioned at a common end of the optical fiber 50.

The light source 61 is shown coupled by a suitable cable 64 to a power supply 66 while the light receiver 62 is coupled via cable 68 to a signal processor 70 such as a computer. The signal processor 70 is shown connected to the power supply 66 through cable 72. The signal processor 70 utilizes a conventional signal processing circuit such as commonly used with optical-fiber sensors as described in the aforementioned patents and normally includes an analog-to-digital conversion circuit within the processor whereby the digital signals are translated by the signal processor 70 into information desired of the sensor. In accordance with the present invention, the signal processor 70 also includes a clock or timing circuit (not shown) of any suitable conventional design so as to provide data indicative of the extent of each articulation with respect to time such as shown in the wave-form graph 74.

While the power supply 66 and the signal processor 70 are shown separately packaged and separate from the body, it will appear clear that these systems can be packaged together. Also, if desired, a suitable power supply and a signal storing device such as a diskette recorder may be attached to the upper or lower section of the device 10 or to another appropriate place on the body of the user so that the desired information can be gathered on the diskette for subsequent processing in a suitable signal processor.

In a typical utilization of the device 10 the genuflexion of the knee 14 at various angles will provide a wave-form signal 74 in which the wave forms are indicative of the extent of knee bending over a period of time. This monitoring of knee articulation is highly beneficial for orthopedic rehabilitation since it provides an accurate record of the extent of knee movement during such rehabilitation over a period of time.

Figure 3:
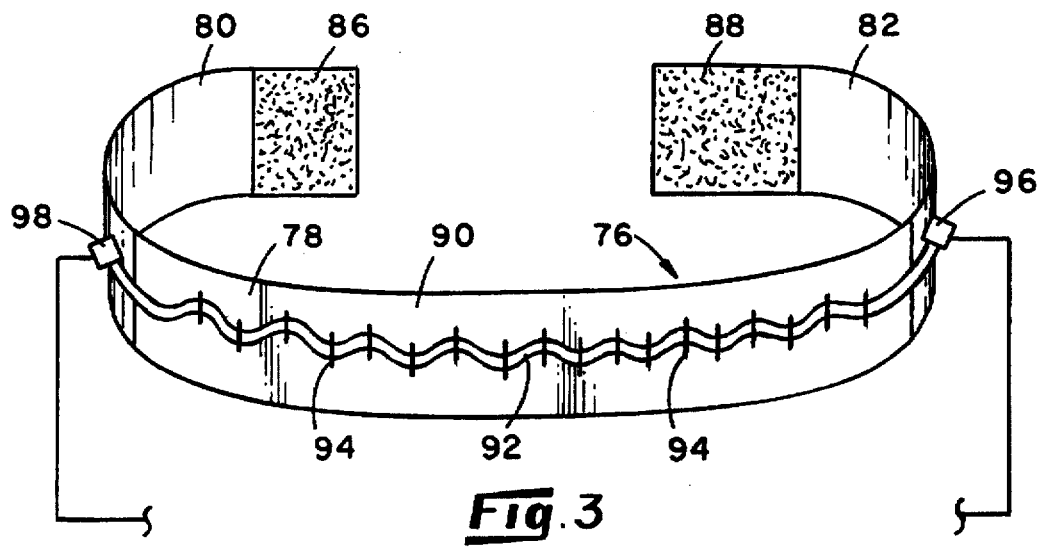
FIG. 3 is a schematic illustration showing another embodiment of the present invention in which an elastic band supporting the optical-fiber sensor is attachable to the chest region of a human being for monitoring and measuring chest expansion during a breathing exercise.
Figure 4:
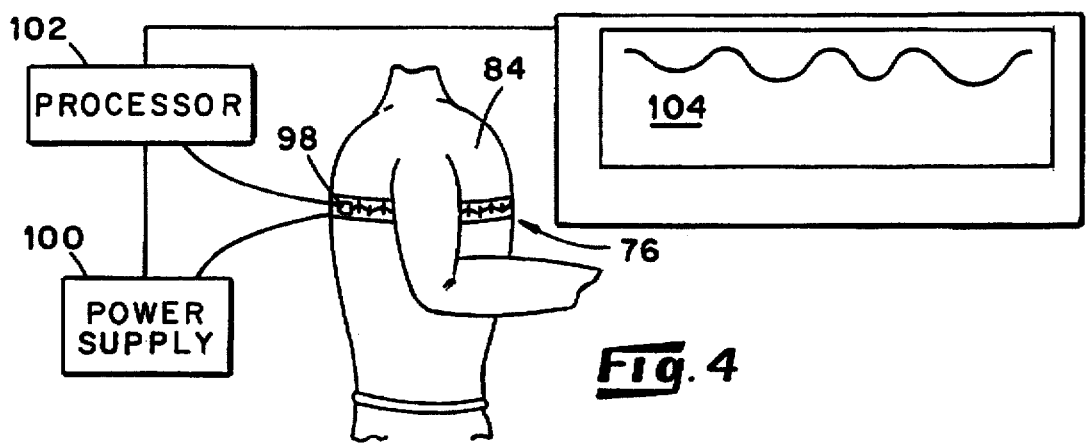
FIG. 4 is a view illustrating the embodiment of FIG. 3 as attached to the chest region of a human being and further shows the circuitry utilized for the detecting chest movement with respect to time.
Figure 5:
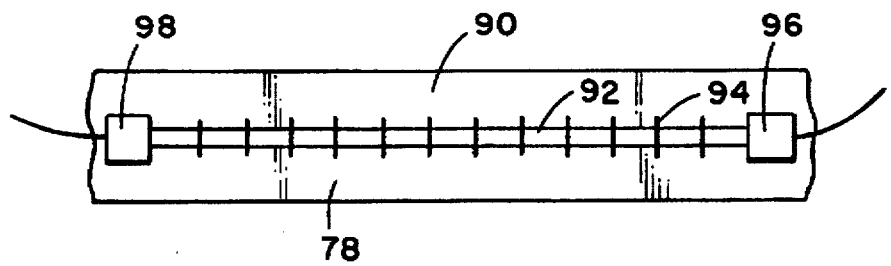
FIG. 5 is a modification of the embodiment of FIG. 3 wherein the optical fibers are disposed in linear orientation rather than a serpentine orientation as in FIG. 3.

FIGS. 3–5 illustrate a second embodiment of the present invention which is directed to fiber-optic device generally shown at 76 for accurately monitoring breathing parameters of a user as defined by chest expansion during respiration and contraction during aspiration, particularly with respect to time, so as to measure the breathing rate of the user. As shown the fiber-optic monitoring and measuring device 76 is formed of a band 78 of elastic woven material as commercially available for the wrapping of body areas for structural support. As used in the present invention, the band 78 may be of a width in the range of about 1 to 3 inches with the free ends 80 and 82 of the band 78 joined together in the back region of the user so as to encompass the chest region 84 of the user as generally shown in FIG. 4. These ends 80 and 82 of the band 78 may be suitably attached to one another by using "Velcro" fasteners, plastic or metal buckles as commonly used for fastening together band material, or any other suitable fastening mechanism. Such "Velcro" fasteners are generally shown at 86 and 88. The band 78 may be formed entirely of elastic webbing or be provided with a central body portion 90 of elastic webbing while the balance of the band 78, i.e., the end portions 80 and 82, may be formed of a less elastic material such as leather or plastic. This central portion 90 supports an optical fiber 92 formed of elastomeric material such as utilized in the formation of the optical fiber 50 in the embodiments of FIGS. 1 and 2.

In FIG. 3 the optical fiber 92 is shown attached to the surface of the central portion 90 of the band 78 and oriented in a serpentine pattern so that as expansion of the chest occurs during respiration the optical fibers will undergo bending not only linearly as the effective lengths of the band 78 and the optical fiber 92 are increased, but also circumferentially during the deflection of the optical fiber 92 from its original longitudinal axis so as to deform the optical fiber 92 and change the amount of light being transmitted therethrough. In addition to the changing of the amount of light passing through the optical fiber 92 during this bending of the optical fiber, the increasing of the effective length of the central body portion 90 of the band 78 also stretches the optical fiber 92 so as to decrease the cross-sectional dimension thereof which in turn also attenuates or changes the amount of light passing through the optical fiber 92. These changes in the amount of light transmitted being through the optical fiber 92 are dependent upon the extent of optical fiber deformation as determined by the extent of chest expansion during respiration of the user. The optical fiber 92 can be attached to the central section 90 of the elastic band 78 in any suitable manner such as by using a basting-like stitching pattern as generally shown at 94. This stitching 94 will permit the linear stretching of the optical fiber to occur and will also provide for some pinching of the optical fiber 92 during the expansion of the chest so as to provide an additional degree of deformation to the optical fiber 92 resulting in further attenuation of the light transmitted through the optical fiber 92. Thus, the deformation of the optical fiber 92 as provided by circumferential bending, linear stretching and pinching effects an accurate light signal indicative of chest expansion can be provided at the signal processor for producing a signal such as a wave form indicative of chest expansion based on time.

Instead of using stitching such as at 94 for attaching the optical fiber 92 to the central portion 90 of the elastic band 78, the optical fiber 92 may be supported on this central portion by weaving the optical fiber 92 within the webbing defining of the elastic band or otherwise incorporating the optical fiber 92 in the elastic webbing during the formation of the band 78. Also, while the central portion 90 of the band 78 is described as being formed of elastic webbing, it will appear clear that the central portion 90 of the band 78 or the entire band can be formed of any suitable elastic material such as synthetic rubber. As with the embodiments of FIGS. 1 and 2, the chest expansion monitoring device 76 as shown in FIGS. 3-5 is provided with a suitable light source 96 such as an LED and a light receiver 98 such as a photo diode which are appropriately coupled to a power supply 100 and a processor 102 for providing a signal or data such as wave-forms generally shown by the graph 104 wherein the extent of chest expansion is shown with respect to time.

Instead of mounting the optical fiber 92 on the central reign 89 of the band 80 in a serpentine configuration as shown in FIGS. 3 and 4, the optical fiber 92 may be secured such as by stitching or the like 94 in an orientation that is co-linear with the central portion 90 of the band 78 so that any deformation of the optical fiber 92 is based upon the stretching and circumferential bending of the optical fiber 92 for providing the desired signal to the processor 102.

It will be seen that the present invention provides fiber-optic sensing apparatus which are particularly suitable for the monitoring of joint articulation and chest movement of the human body. Also, while the embodiments of FIGS. 1 and 2 are particularly directed to the monitoring of knee articulation, it will appear clear that a similar type of apparatus with a hinging mechanism supporting an optical-fiber sensor can be utilized for monitoring the articulation of other joints of the human body such as a wrist, elbow, shoulder, thigh, or ankle so as to be particularly suitable for therapeutic rehabilitation of any joint in the human body.

What is claimed is:

1. A fiber-optic device for monitoring the extent of movement of a component of a human body, comprising base means having first and second end portions and a moveable central portion adapted to at least substantially span a selected movable component of a human body, securing means for fastening the first and second end portions of the base means to selected portions of the human body to maintain the base means in a fixed position with respect to said selected portions of a human body with the central portion of the base means at least substantially spanning the selected component of the human body for conjunctive movement therewith, optical fiber means formed of an elastomeric material and having first and second end regions and a central region therebetween, first attaching means for fixedly attaching the first and second end regions of the optical fiber means to the first and second end portions of the base means with the central region of the optical fiber means extending between the fixedly attached first and second end portions of the optical fiber means being positioned contiguous to the movable central portion of the base means and at least substantially spanning the selected body component, second attaching means for securing the central region of the optical fiber means to the movable central portion of the base means for effecting conjunctive movement therewith upon movement of the selected body portion to deform the central region of the optical fiber means with the extent of the deformation of the central region of the optical fiber means being dependent upon the extent of conjunctive movement of the central region of the optical fiber means with the central portion of the base means, light transmitting means coupled to one of said end regions of the optical fiber means for transmitting light through the optical fiber means, light receiving means coupled to one of said end regions of the optical fiber means for receiving light transmitted through the optical fiber means with the amount of light being received by the light receiving means being proportional to the extent of deformation of the central region of the optical fiber means and providing a signal indicative of the extent of each movement of the selected body portion from a selected position.

2. A fiber-optic device for monitoring the extent of movement of a component of a human body as claimed in claim 1, wherein the selected component of the human body is an articulation providing relative movement between adjacent skeletal portions of the human body.

3. A fiber-optic device for monitoring the extent of movement of a component of a human body as claimed in claim 2, wherein the articulation is a knee, wherein the first end and second end portions of the base means are respectively adapted to at least substantially encompass leg regions of the human body located above and below the knee, wherein the central portion of the base means comprises hinge means having first and second sections relatively movable with respect to one another about a arcuate plane upon genuflection of the knee, wherein the central region of the optical fiber means is supported by the first and second end sections by said means for attaching the central region optical fiber means to the central portion of the base means, and wherein the relative movement between the first and second sections of the hinge means effects the deformation of the central region of the optical fiber means.

4. A fiber-optic device for monitoring the extent of movement of a component of a human body as claimed in claim 3, wherein the first and second sections of the hinge means are fixedly supported at one end region thereof to the first and second end portions of the base means and are coupled together at an opposite end region thereof by pivot means providing an axis for the relative movement between the first and second sections of the hinge means.

5. A fiber-optic device for monitoring the extent of movement of a component of a human body as claimed in claim 4, wherein the first and second sections of the hinge means each have first and second oppositely disposed edge regions separated from one another by a substantially planar central region, wherein the pivot means are supported by the planar central region of the first and second sections of the hinge means, and wherein the central region of the optical fiber means is supported and extends along at least substantial portions of the first edge region of the first and second sections of the hinge means.

6. A fiber-optic device for monitoring the extent of movement of a component of a human body as claimed in claim 5, wherein the second attaching means for securing the central region of the optical fiber means to the central movable portion of the base means comprises fastening means attached to the first and second sections of the hinge means and at least partially encompassing segments of the central region of the optical fiber means for supporting and maintaining the central region of the optical fiber means on said first edge region of the first and second sections of the hinge means.

7. A fiber-optic device for monitoring the extent of movement of a component of a human body as claimed in claim 6, wherein said fastening means comprises clip means for affixing the optical fiber means in place on said first edge region of the first and second sections of the hinge means, and wherein the deformation of said central region of the optical fiber means is provided by a bending of a segment of the central region of optical fiber means about said axis during the genuflection of the knee.

8. A fiber-optic device for monitoring the extent of movement of a component of a human body as claimed in claim 7, wherein said fastening means comprises tubular means affixed to said first edge region of the first and second sections of the hinge means, wherein at least substantial portions of central region of the optical fiber means is contained within said tubular means and relatively movable with respect thereto, and wherein the deformation of said central region of the optical fiber means is provided by stretching the central region of the optical fiber means during the genuflection of the knee.

9. A fiber-optic device for monitoring the extent of movement of a component of a human body as claimed in claim 3, wherein the optical fiber means comprises a core with a cladding concentrically disposed thereabout, and wherein the elastomeric material of at least one of the core and the cladding is silicone rubber.

10. A fiber-optic device for monitoring the extent of movement of a component of a human body as claimed in claim 3, wherein said securing means for fastening the first and second end portions of the base means to the selected body portions comprise strap means attached to the base means and supporting buckle means for securing the strap means in a selected position.

11. A fiber-optic device for monitoring the extent of movement of a component of a human body as claimed in claim 3, wherein timing means are coupled to receive said signal for providing a signal indicative of the number of movements with respect to time and the duration of time between and during each movement of the selected body portion.

12. A fiber-optic device for monitoring the extent of movement of a component of a human body as claimed in claim 1, wherein the selected portion of the human body is the chest region of the body subject to expansion and contraction, wherein the base means comprises elongated belt means encompassing the body about said chest region, wherein the moveable central portion of the base means comprises an elongated segment of the belt means formed of elastic material and substantially encompassing the chest region, wherein the central region of the optical fiber means is supported by the elastic segment, and wherein the deformation of said central region of the optical fiber means is provided by the stretching of the elongated segment of elastic material during the expansion of the chest region and thereby effecting at least one of stretching and bending of the central region of the optical fiber means.

13. A fiber-optic device for monitoring the extent of movement of a component of a human body as claimed in claim 12, wherein the optical fiber means comprises a core with a cladding concentrically disposed thereabout, and wherein the elastomeric material of at least one of the core and the cladding is silicone rubber.

14. A fiber-optic device for monitoring the extent of movement of a component of a human body as claimed in claim 12, wherein timing means are coupled to receive said signal for providing a signal indicative of the number of movements with respect to time and the duration of time between and during each movement of the selected body portion.

15. A fiber-optic device for monitoring the extent of movement of a component of a human body as claimed in claim 12, wherein the central region of the optical fiber means is supported on said elastic segment in a serpentine configuration, and wherein said second attaching means comprises thread means for securing the central region of the optical fiber means to the elongated segment of elastic material for conjunctive movement therewith.

16. A fiber-optic device for monitoring the extent of movement of a component of a human body as claimed in claim 12, wherein said second attaching means is provided by embedding the central region of the optical fiber means in the elongated segment of elastic material.

17. A fiber-optic device for monitoring the extent of movement of a component of a human body as claimed in claim 1, wherein timing means are coupled to receive said signal for providing a signal indicative of the number of movements with respect to time and the duration of time between and during each movement of the selected body portion.

18. A fiber-optic device for monitoring the extent of movement of a component of a human body as claimed in claim 1, wherein the optical fiber means comprises a core with a cladding concentrically disposed thereabout, and wherein the elastomeric material of at least one of the core and the cladding is silicone rubber.

* * * * *